United States Patent
Leonard et al.

(10) Patent No.: US 11,195,202 B2
(45) Date of Patent: Dec. 7, 2021

(54) DYNAMIC MONITORING AND CONTROL OF WEB PAGE EXPERIENCES BASED UPON USER ACTIVITY OF ASSOCIATED APPLICATIONS

(71) Applicant: Microsoft Technology Licensing, LLC, Redmond, WA (US)

(72) Inventors: Arthur Charles Leonard, Kirkland, WA (US); Theodore Charles Van Zwol, II, Redmond, WA (US); Viktor Veis, Redmond, WA (US); Pavel Ustinov, Redmond, WA (US); Wenying Hu, Redmond, WA (US); Tyler Dunkel, Kirkland, WA (US); Sean Hsi Lee, Seattle, WA (US); Filip Krzeminski, Sammamish, WA (US); Kevin Mehlhaff, Redmond, WA (US); Eric Gordon Knox, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

(21) Appl. No.: 16/163,533

(22) Filed: Oct. 17, 2018

(65) Prior Publication Data
US 2020/0126112 A1    Apr. 23, 2020

(51) Int. Cl.
*G06Q 30/02*    (2012.01)
*G06F 8/61*    (2018.01)
*G06F 11/34*    (2006.01)

(52) U.S. Cl.
CPC .......... *G06Q 30/0243* (2013.01); *G06F 8/61* (2013.01); *G06F 11/3409* (2013.01); *G06F 11/3438* (2013.01); *G06F 11/3452* (2013.01)

(58) Field of Classification Search
CPC .. G06F 8/60–70; G06F 11/34; G06F 11/3409; G06F 11/3438; G06F 11/3452; G06F 8/77; G06Q 30/0243
(Continued)

(56) References Cited

U.S. PATENT DOCUMENTS 5,732,275 A * 3/1998 Kullick .................... G06F 8/65
                                                            717/170
7,797,545 B2    9/2010 Adams et al.
(Continued)

FOREIGN PATENT DOCUMENTS

EP    2224336 A1    9/2010

OTHER PUBLICATIONS

Fischer, J., et al., Engage: A Deployment Management System, PLDI '12: Proceedings of the 33rd ACM SIGPLAN Conference on Programming Language Design and Implementation, Jun. 2012, pp. 263-274, [retrieved on Jul. 29, 2021], Retrieved from the Internet: <URL:http://dl.acm.org/>.*

(Continued)

*Primary Examiner* — Geoffrey R St Leger
(74) *Attorney, Agent, or Firm* — Newport IP, LLC; Jacob P. Rohwer

(57) ABSTRACT

The present disclosure provides enhanced techniques for dynamically monitoring and controlling user experiences on a website based on user activity of associated software applications. A system can offer a number of web pages to different user groups in an experiment. Each web page can describe respective configurations of an application, and each user group may receive a particular web page based on one or more criteria. An application installer and a resource identifier are transmitted to the client device in response to an installation request. A configuration file is also delivered to the client device based on the resource identifier. The (Continued)

configuration file causes the installation of a particular application configuration on the client device. The application configuration sends telemetry data indicating user retention data to a service. A usage report summarizing the telemetry data is generated and utilized to adjust the criteria for controlling one or more experiments.

20 Claims, 13 Drawing Sheets

(58) Field of Classification Search
USPC .................................................. 717/168–178
See application file for complete search history.

(56) References Cited

U.S. PATENT DOCUMENTS

| | | | | |
|---|---|---|---|---|
| 7,849,458 | B2* | 12/2010 | Kurzweil | G06F 21/10 717/174 |
| 7,877,746 | B2* | 1/2011 | Kahan | G06F 8/60 717/178 |
| 8,375,120 | B2 | 2/2013 | Rand et al. | |
| 8,635,287 | B1 | 1/2014 | Shih et al. | |
| 8,892,727 | B2* | 11/2014 | Mukunthu | G06F 11/3438 709/224 |
| 9,026,905 | B2 | 5/2015 | Tseng et al. | |
| 9,037,975 | B1* | 5/2015 | Taylor | G06F 16/9577 715/733 |
| 9,258,669 | B2* | 2/2016 | Nyisztor | G06F 8/60 |
| 10,228,926 | B2* | 3/2019 | Soini | H04L 67/42 |
| 2003/0084439 | A1* | 5/2003 | Perkins | H04L 29/06 717/177 |
| 2004/0237084 | A1* | 11/2004 | Kurzweil | G06F 21/629 717/178 |
| 2007/0067297 | A1* | 3/2007 | Kublickis | G06Q 20/29 |
| 2008/0077915 | A1* | 3/2008 | Kahan | G06F 8/60 717/178 |
| 2009/0249071 | A1 | 10/2009 | De atley et al. | |
| 2009/0292584 | A1* | 11/2009 | Dalal | G06Q 30/02 705/7.29 |
| 2013/0019007 | A1* | 1/2013 | Mukunthu | H04L 67/22 709/224 |
| 2014/0258506 | A1 | 9/2014 | Stickle | |
| 2014/0278747 | A1 | 9/2014 | Gumm | |
| 2015/0040201 | A1* | 2/2015 | Nyisztor | G06F 8/71 726/7 |
| 2015/0100688 | A1 | 4/2015 | Richardson et al. | |
| 2016/0224461 | A1 | 8/2016 | Araya | |
| 2017/0220330 | A1* | 8/2017 | Soini | G06F 8/61 |
| 2018/0129946 | A1 | 5/2018 | Ellis et al. | |
| 2018/0302494 | A1* | 10/2018 | Jain | H04L 67/34 |

OTHER PUBLICATIONS

Becker, G., et al., Managing Combinatorial Software Installations with Spack, HUST '16: Proceedings of the Third International Workshop on HPC User Support Tools, Nov. 2016, pp. 14-23, [retrieved on Jul. 30, 2021], Retrieved from the Internet: <URL:http://dl.acm.org/>.*

"International Search Report and Written Opinion Issued in PCT Application No. PCT/US2019/044007", dated Dec. 10, 2019, 19 Pages.

Bullwinkle, et al., "Instrument web apps at runtime with Application Insights", Retrieved From: https://docs.microsoft.com/en-us/azure/application-insights/app-insights-monitor-performance-live-website-now, May 5, 2017, 15 Pages.

Fairfax, et al., "Dynamic Certificate Management for a Distributed Authentication System" Application as Filed in U.S. Appl. No. 15/989,497, filed May 25, 2018, 54 Pages.

* cited by examiner

| USER GROUPS 103 | N-DAY RETENTION SCORE 702A | EDIT TIME SCORE 702B | AMOUNT OF DATA SCORE 702C | TOTAL USAGE SCORE 702D | TIME SPENT SCORE 702E | WEB PAGE EXPERIENCE 702F | TOTAL SCORE 720 |
|---|---|---|---|---|---|---|---|
| A | 4 | 6 | 8 | 6 | 8 | PAGE 1 | 32 |
| B | 8 | 6 | 5 | 8 | 10 | PAGE 2 | 37 |
| C | 2 | 2 | 2 | 1 | 2 | PAGE 3 | 9 |

Usage Report 602

FIGURE 7

DYNAMIC MONITORING AND CONTROL OF WEB PAGE EXPERIENCES BASED UPON USER ACTIVITY OF ASSOCIATED APPLICATIONS

BACKGROUND

Software application designers continually strive to optimize features of their products. One way to measure the success of each version of a software application is to measure one or more performance metrics with respect to user activity. For instance, a company may want to know how long an application can maintain a user's attention before they stop using it. Further, a company may want to know how a particular web page that is used to deliver an application may influence user retention for a particular version or configuration of the application. However, some existing technologies are limited in providing accurate measurements for such performance metrics.

Some present user retention experiments are limited to measuring discrete aspects of individual user activity. For example, user retention measurements typically include distinct measurements with respect to a web page, desktop application, or a mobile phone application. Because of this limitation, some experimental results may not measure all individual users equally or allow for analysis that coordinates different metrics. Thus, when a designer makes changes to both a software application and changes to a related web page, it may be difficult to identify the features that did or did not influence user retention. Present user experiments may also use a blind selection process that delivers results from different users. However, the blind user selection may not cure the same difficulty in identifying specific software features and related web page experiences that did or did not influence the retention of a user cohort.

Further, present user retention experiments may require a user to provide a unique identifier, email address, or login ID and password so that measurements of each the user's experiences can be correlated with an experimental web portal or application. This type of approach is cumbersome to users, and such features may affect a user's willingness to participate in an experiment, which ultimately leads to skewed or incomplete results.

Yet further, when conducting a retention experiment on a software application having a number of installation configurations, it can be difficult to track which configuration each user has installed. In addition, it can be even more difficult to identify a particular web page a user accessed to obtain information about a particular software configuration. Such deficiencies can leave a number of voids in user performance data that ultimately hinder the optimization of the application configurations or the optimization of websites delivering such software applications.

It is with respect to these and other considerations that the disclosure made herein is presented.

SUMMARY

Technologies described herein provide enhanced techniques for dynamically monitoring and controlling user experiences on a website based on user activity of associated software applications executing on remote client computers. In some embodiments, a website is used to facilitate a user experiment involving a number of application configurations and a number of web page experiences. Each web page experience can describe an individual application configuration and an offer to continue the user experience using a rich application on a client device. In one illustrative example, a website may provide individual web pages describing individual configurations of Visual Studio. In such an example, each page can describe individual configurations of Visual Studio such as, but not limited to, Visual C++ without supporting documents, Visual C++ with supporting documents, or Visual C++ with a customized set of supporting documents. Each web page experience can be delivered to individual experiment groups based on one or more criteria. For instance, the web page describing Visual C++ without supporting documents can be selected for delivery to a control group, while the other web pages can be selected for delivery to one or more treatment groups. Each web page experience can be directed to a group of users on a random basis or guided by allocations. For instance, a system with three web pages can evenly distribute the three web pages between different user groups, or individual users, or direct a certain percentage of web pages to certain user groups.

Each group can obtain an installation application with an associated resource identifier. The resource identifier can then be used to retrieve a configuration file for enabling a client device to install a specific application configuration. The application configuration sends telemetry data, e.g., user activity or user retention data, with the resource identifier and/or an experiment identifier provided in the configuration file. The telemetry data can then be analyzed to modify the criteria for directing the web pages to targeted experiment groups for purposes of improving the website. The telemetry data can also provide indicators that enable designers to optimize application features.

The techniques disclosed herein can measure experiments effectively to allow designers to iterate on designs. By providing telemetry data that associates user activity of a particular application configuration with a web page experience, a website delivering the web page experiences can be optimized. In addition, the telemetry data can be used to optimize particular features of the application. By the use of a resource identifier or an experiment identifier, user activity of each application configuration can be associated with a web page experience without requiring a user to create a login or unique identifier. The embodiments disclosed herein ultimately help developers improve user retention for individual configurations of an application and improve user retention for web page experiences associated with a respective application configuration. The embodiments disclosed herein also enable a system to utilize a single version of an installation application for installing a number of application configurations, and enabling a system to monitor usage data for each configuration on a per user or per user group basis. By enabling a system to use a single version of an installation application, the use of computing resources, such as storage resources, and development resources can be mitigated.

Among many other benefits, the techniques shown herein improve efficiencies with respect to a wide range of computing resources. For instance, human interaction with a computing device may be improved through the use of experiments and improved user experiences delivered on a web site describing configurations of an application. The techniques shown herein also allow improvement of an application through operations that allow iterative design improvements to configurations of the application. Other technical effects other than those mentioned herein can also be realized from implementations of the technologies disclosed herein.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 7 illustrates an example usage report generated by the system;

DETAILED DESCRIPTION

Figure 1:
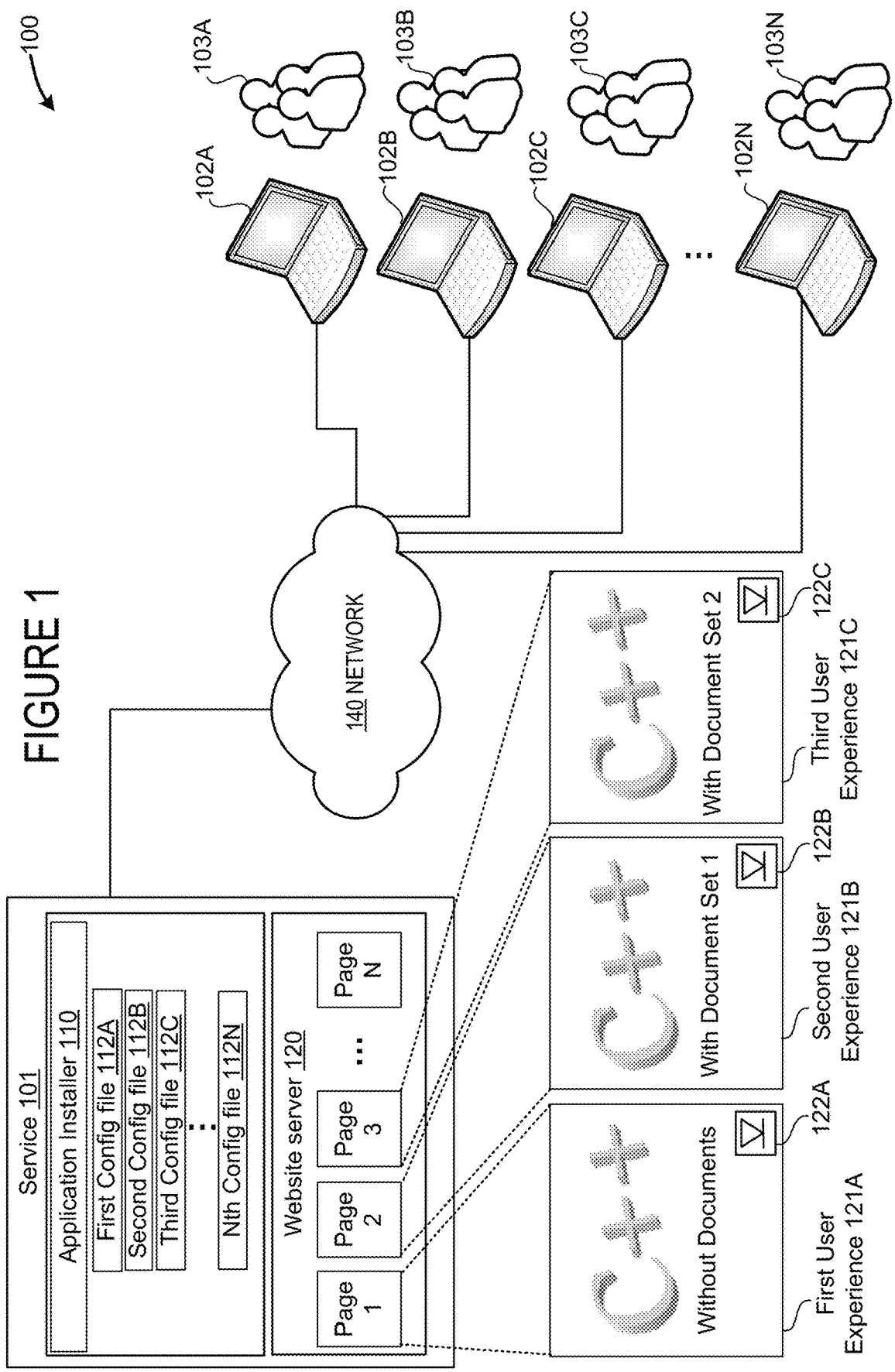
FIG. 1 is a block diagram of a system for dynamically monitoring and controlling user experiences on a website based on user activity of associated software applications.

FIG. 1 illustrates a system 100 for dynamically monitoring and controlling user experiences on a website based on user activity of associated software applications. As shown, the system includes a service 101 and a number of client devices 102 that correspond to a number of user groups 103. The service 101 and the client devices 102 can communicate via a network 140. This example is provided for illustrative purposes and is not to be construed as limiting. It can be appreciated that the system 100 can include any number of devices and involve any type of suitable computing system.

For illustrative purposes, the service 101 is illustrated here, for convenience, as operating from a single computing device. However, the service 101 may be implemented across one or more computing devices in a server farm or in a distributed configuration. The service 101 and the website server 120 can be executing on a single computer or separate computers. Each client device 102 (individually referred to herein as a "first device 102A," "second device 102B," etc.) represents an individual computer that can be used by an individual human user of a particular group 103, also referred to herein as a "user group 103" or a "cohort 103." Each client device 102 can be any type of a computing device, including but not limited to, a desktop computer, a mobile device, or multiple computers.

For illustrative purposes, each group 103 can be individually referred to as a first group 103A, second group 103B, a third group 103C, up to N groups. Each group may involve users having a commonality. For example, a particular group 103 may have users that share a common interest or a common behavior that allows them to be considered a cohort. For example, a particular user group 103 may all be described as a cohort of students, or computer science students. In another example, individual users of a user group 103 may have a commonality in their history of web activity. In such an example, the commonality of a group of users may be determined based on tracking analytics, such as Google Analytics from Google Inc. of Mountain View, Calif. In the illustrative example provided herein, the first group 103A is a control group, and the second group 103B and the third group 103C are treatment groups.

The service 101 is also associated with a website server 120 that can provide a number of web pages 121. For illustrative purposes, each web page 121 is also referred to herein as a "web page experience 121" or an "experience 121." In some embodiments, each web page 121 can provide a distinct user experience describing a specific application configuration. For example, the first page 121A provides a first user experience that includes information related to a first configuration of an application, such as Visual C++ without supporting documents. The second page 121B provides a second user experience that includes information related to a second configuration of the application, such as Visual C++ with a first set of documents. The third page 121C provides a third user experience that includes information related to a third configuration of the application, such as Visual C++ with a second set of documents. Web pages 121 offering different application configurations, which may include adjustments to supporting documentation, can be used to run one or more additional experiments for different user groups 103.

In addition to providing a description of an application configuration, each web page 121 can also provide content offering users to continue the user experience using a rich application on a client computer. The offer can include instructions that allow users to download a particular configuration of a client application. In some embodiments, the offer can be displayed as graphical content 122, which can include a text description of an offer to continue user experience of the web page on a client device. In some embodiments, the graphical content 122 can also include a selectable graphical element comprising a link configured to receive an input gesture from a user. In the example shown in FIG. 1, each web page 121 includes graphical content 122 in the form of user-selectable icons, respectively referred to herein as items 122A, 122B and 122C for each of the three web pages 121A, 121B and 121C. In this example, the graphical content 122 can be selected by a user to initiate a download of an application installer 110, also referred to herein as an "installer 110" or "bootstrap program." In some configurations, the service 101 may download the application installer 110 to a client device 102 in response to a user request.

In some embodiments, the service 101 may store the application installer 110 and a number of configuration files 112 associated with the application installer 110. For illustrative purposes, the configuration files 112 are individually referred to herein as a first configuration file 112A, a second configuration file 112B, a third configuration file 112C, to N configuration files 112N. Individual configuration files 112 include installation parameters to control the installation of a particular configuration of an application. For instance, an installation parameter may control an installer 110, such as Visual Studio, to install an application configuration, such as Visual C++. Additional aspects of the configuration files are described in more detail below in association with FIG. 6.

Figure 2:
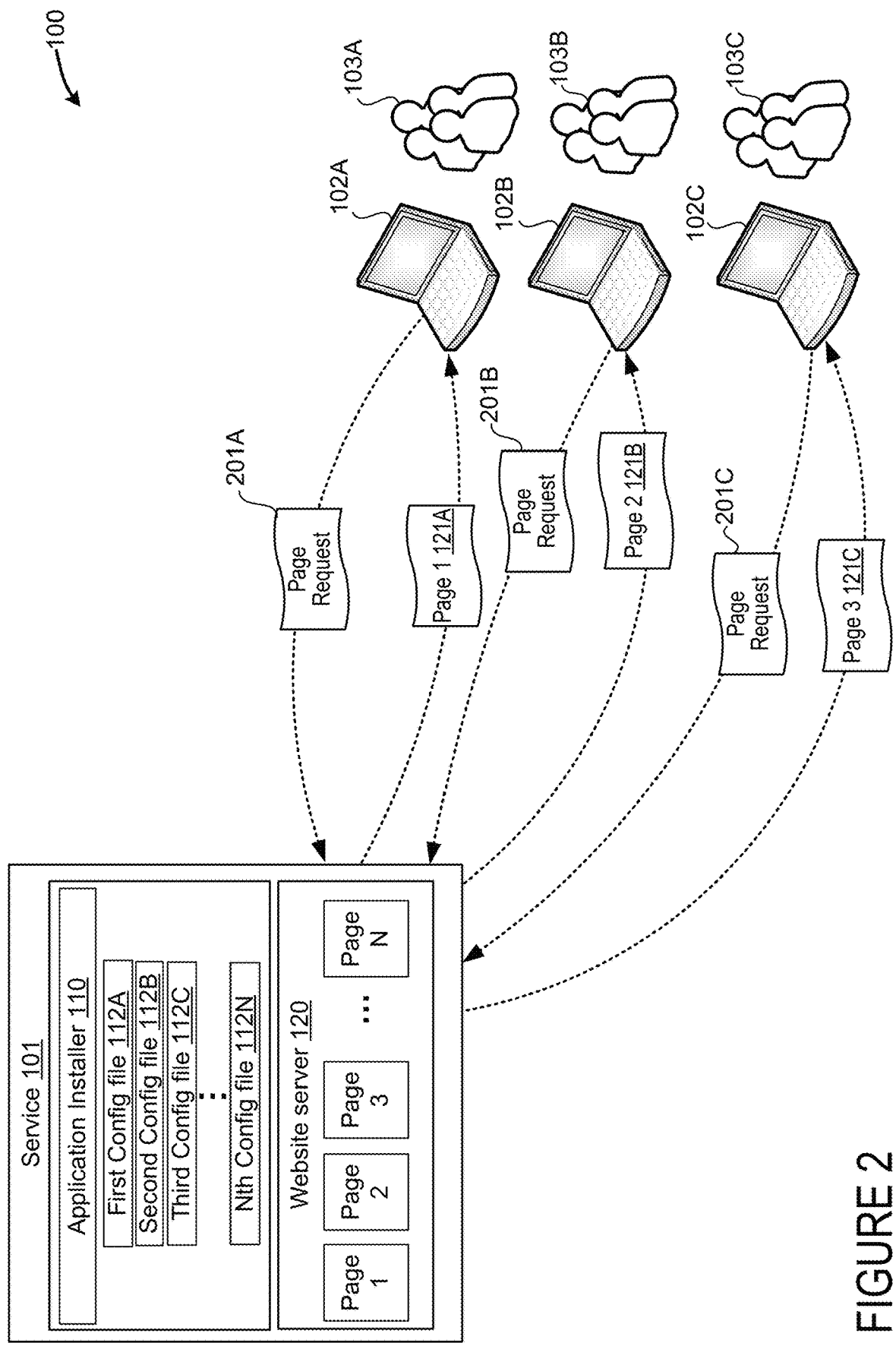
FIG. 2 is a block diagram illustrating aspects of a page request and a web page delivery.

Referring now to FIG. 2, a block diagram illustrating aspects of a page request 201 and a web page delivery are shown and described below. Generally described, the system 100 enables individual users of each group 103 to access web pages using their respective client devices 102. Users of each group 103 can send page requests 201 to the web server 120, and in response to each request 201, the web server 120 selects a web page 121 based on one or more criteria and delivers the selected web page 121 to the requesting client device 102.

The criteria for selecting a particular web page 121, i.e., delivering a particular experiment to a designated group 103, can generally direct certain experiments to different groups having common interests, common characteristics, or common behaviors. For example, users that work for a large software development company may be directed to a first web page 121A, while university students are directed to a second web page 121B. The criteria may also be based on other user activity. For instance, users that were referred to the service 101 through a blog site may be directed to the first web page 121A, while users that were referred to the service 101 through a search engine may be directed to the second web page 121B. Such examples are not to be construed as limiting as the criteria can select particular web pages for particular groups 103 based on any type of behavior such as, but not limited to, searching, browsing, direct addressing, favorites, or groups such as a student page. A history of user activity may be acquired through a suitable tracking analytics system, such as Google analytics. Other criteria may be based on characteristics of an Internet address, a geographical location, one or more referring or originating domains, etc.

In the present example, the first page 121A is selected based on one or more criteria and delivered to users of the first group 103A, the second page 121B is selected based on one or more criteria and delivered to users of the second group 103B, and the third page 121C is selected based on one or more criteria and delivered to users of the third group 103C. It can be appreciated that such an arrangement can be utilized to run a number of experiments that include at least one control group and at least one treatment group.

Figure 3:
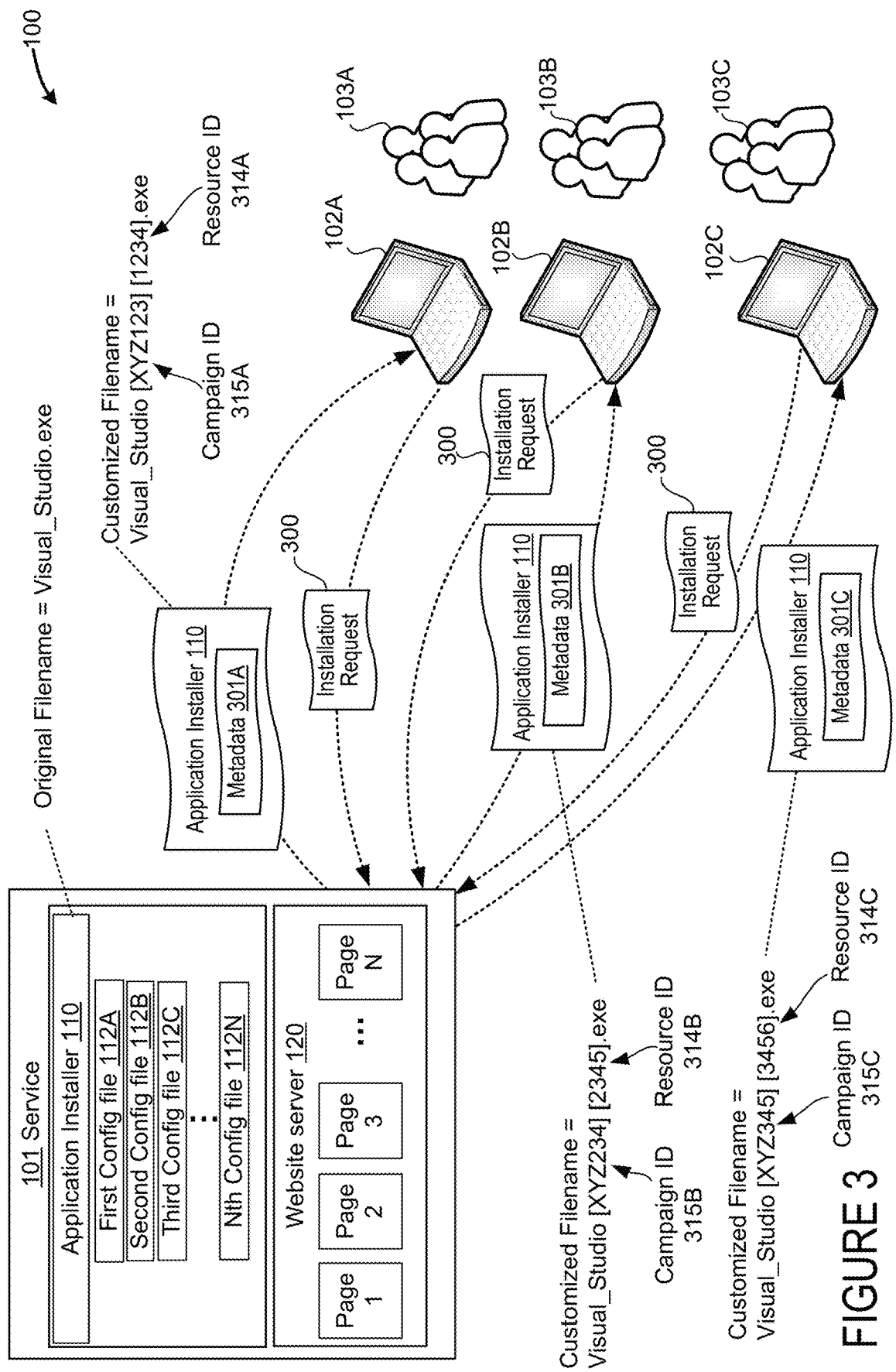
FIG. 3 is a block diagram illustrating aspects of an installation request and the delivery of an application installer.

Referring now to FIG. 3, a block diagram showing aspects of an installation request 300 and the delivery of an application installer 110 is shown and described. As described above, each web page 121 can describe a particular configuration of an application and an offer to continue the user experience using a rich application installed on a client device 102. A user can invoke an installation of a configuration associated with a particular web page 121. In some embodiments, a user can send an installation request from a client device 102 to the service 101. The installation request 300 can be invoked by any suitable actions, including a user selection of a link on a web page 121.

In response to receiving an installation request 300, the service 101 can initiate a download of the application installer 110. As summarized above, the application installer 110 is configured to install one or more applications. One example of an application installer 110 is the Visual Studio enterprise installer. Depending on one or more selected configurations, the application installer 110 can be used to install an entire suite of applications or individual application configurations, such as Visual C++, Visual C#, etc.

In addition to delivering application installer 110, the service 101 also provides metadata 301, which can include one or more identifiers. In some configurations, the metadata 301 comprises a resource identifier 314 and optionally a campaign identifier 315. In general, the resource identifier is used to identify an associated configuration file 112. For illustrative purposes, Metadata sent to individual groups can be referred to herein as a first metadata 301A, a second metadata 301B, and a third metadata 301C. The resource identifier 314 can also identify an associated web page 121 experience. The campaign identifier 315 is an identifier used to track an individual user through a set of experiments. The campaign identifier 315 may be generated using tracking analytics, such as Google Analytics. For example, the campaign identifier 315 may be generated using a hash of a user's MAC address.

In the illustrative example of FIG. 3, the metadata 301 can be embedded into the filename of the application installer 110. In general, the resource identifier 314 and the campaign identifier 315 can be in any suitable format. In one specific format, as shown in FIG. 3, the service 101 may generate a customized filename for the application installer 110. The customized filename can be formatted to have a descriptive name, such as "Visual_Studio" followed by the campaign identifier 315 and the resource identifier 314. In this example, the first client 102A can receive an application installer 110 having a customized filename=Visual_Studio [XYZ123].[1234].exe where [XYZ123] represents the first campaign identifier 315A and [1234] represents the first resource identifier 314A. FIG. 3 similarly illustrates inclusion of metadata 301B and 301C with customized file names in the application installer 110 respectively transmitted to the other client devices 102B and 102C. This example is provided for illustrative purposes and is not to be construed as limiting, as any number or configuration of customization digits may be used.

In some configurations, the campaign identifier 315 can be unique to a particular user, and the resource identifier 314 can be unique to a particular user group 103, e.g., a particular control group or a particular treatment group. In the example shown in FIG. 3, users of the control group 103A are assigned a first resource identifier 314A, [1234]. Users of the first treatment group 103B are assigned a second resource identifier 314B, [2345], and users of a second treatment group are assigned a third resource identifier 314C, [3456]. The examples of the campaign identifiers 315 are provided for illustrative purposes, it can be appreciated that these identifiers can be different for individual users of each group.

In some embodiments, when a copy of the application installer 110 already exists on a client device 102, the service 101 can determine if the copy of the application installer 110 is current. If the application installer 110 stored at the client device 102 is current, the service 101 can communicate the metadata to the requesting client device 102 in response to receiving an installation request 300.

Figure 4:
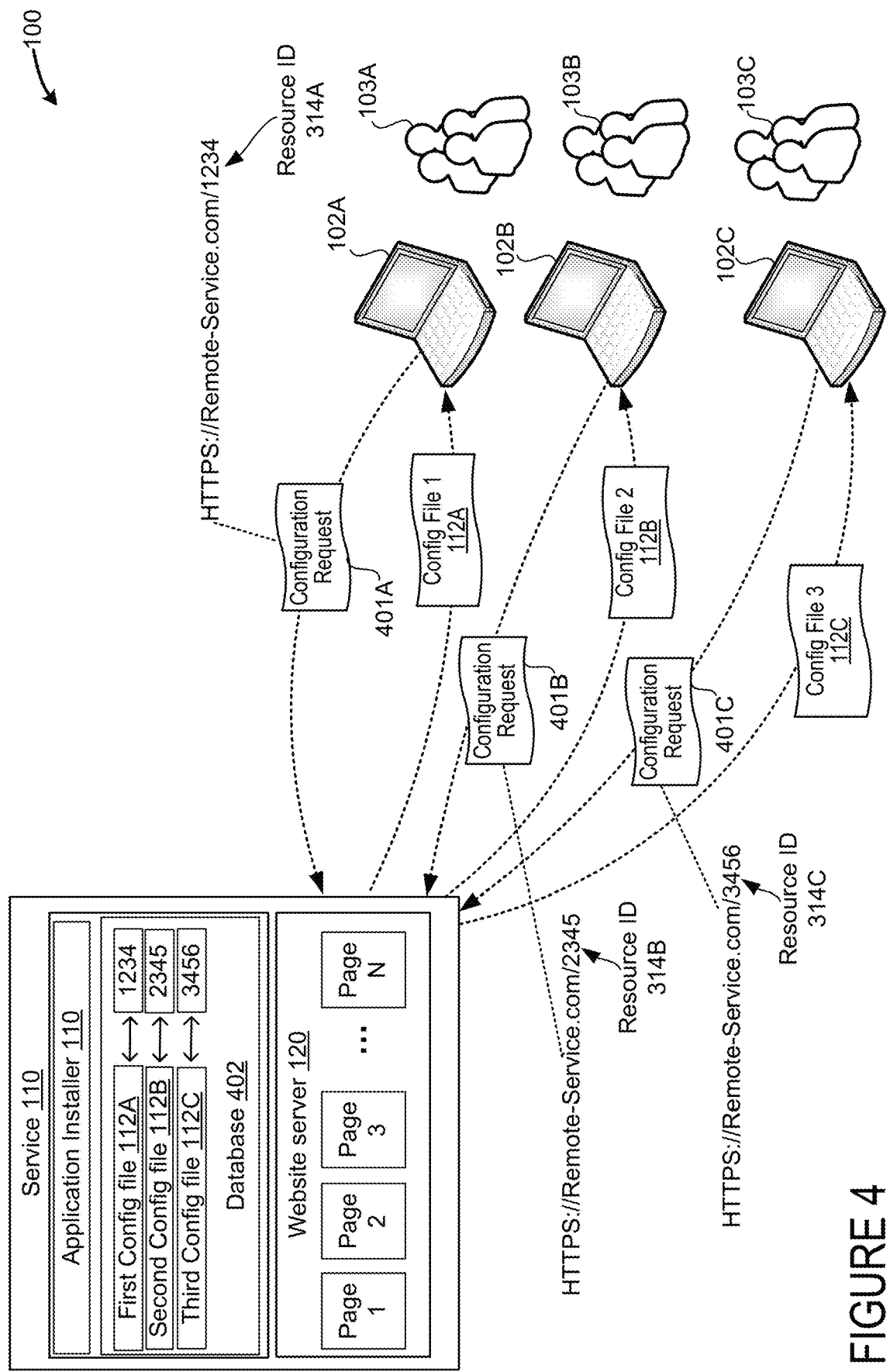
FIG. 4 is a block diagram illustrating aspects of a configuration request and the delivery of one or more configuration files.

Referring now to FIG. 4, aspects of a configuration request 401 and the delivery of the configuration files 112 are shown and described below. Once a client device 102 receives a copy of the application installer 110, or alternatively, once a copy of an application installer 110 is verified on the client device 102, the application installer 110 can be executed. Upon execution, the application installer 110 can read the metadata 301 and generate a configuration request 401. In one illustrative example, the application installer 110, such as Visual Studio, can obtain the resource identifier 314 from the filename of the application installer 110. The application installer 110 can then generate a configuration request 401 and send the configuration request 401 to the service 101 to retrieve a configuration file. In some embodiments, the configuration request may also include other identifiers such as the campaign identifier 315.

Each configuration request 401 may be in any format that suitably communicates the resource identifier 314. In the examples shown in FIG. 4, the configuration requests are shown to be in the format of a uniform resource locator (URL), e.g., https://Remote-Service.com/1234. In this example, a first configuration request 401A can include the first resource identifier 314A, a second configuration request 401B can include the second resource identifier 314B, and a third configuration request 401C can include the third resource identifier 314C. In response to each configuration request 401, the service 101 accesses one or more resources, such as a database 402, to identify and retrieve a configuration file 112 associated with each received resource identifier 314.

The service 101 can use any suitable resource, such as the database 402, to associate individual resource identifiers with a corresponding configuration file 112. In the present example, FIG. 4 illustrates that the first resource identifier 314A, e.g., 1234, received from the client device 102A is associated with first configuration file 112A, the second resource identifier 314B, e.g., 2345, received from the client device 102B is associated with second configuration file 112B, and the third resource identifier 314B, e.g., 3456, received from the client device 102C is associated with third configuration file 112C. In this example, each of the identified configuration files 112 are identified using the resource identifiers 314, and each of the identified configuration files 112 are communicated from the service 101 to each requesting client device 102. Once each configuration file 112 is received by a client device 102, the application installer 110 can utilize each configuration file 112 to install a particular application configuration.

Figure 5:
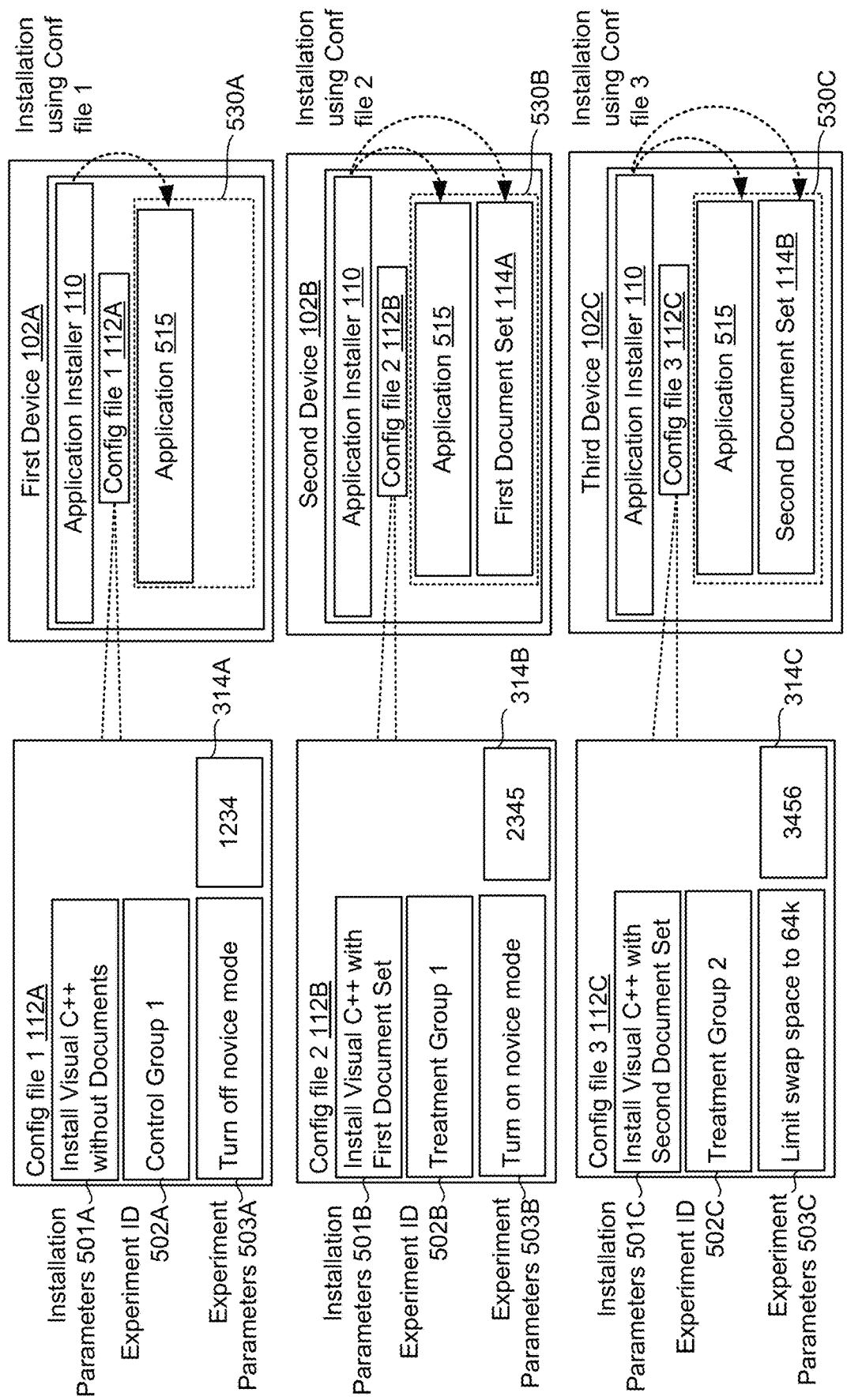
FIG. 5 is a block diagram of several client devices illustrating an installation process utilizing different configuration files.

FIG. 5 illustrates additional details of the configuration files 112. In some embodiments, the configuration files 112 include installation parameters 501, an experiment identifier 502 ("Experiment ID"), experiment parameters 503, and the resource identifier 314. The installation parameters 501 can determine the features the application installer 110 will install on a client device 102. For instance, in the example involving Visual Studio, a configuration file 112 can control the application installer 110 to install Visual C++ without documents, or Visual C++ with a particular set of documents.

The experiment identifiers 502 can include information describing a group type and/or a name of an experiment. An example of a group type can indicate whether a particular configuration file is associated with a control group or a treatment group. In some embodiments, a name of an experiment may indicate whether a particular configuration is associated with a treatment group or a control group. In general, the information provided in an experiment identifier can be used to control experiments.

The experiment parameters 503 can be utilized to control aspects of an application configuration. For instance, a particular experiment parameter 503 can be used to change an operating mode, e.g., turn on a particular mode of an application. In some specific examples, an experiment parameter 503 can control whether an install application can turn on a novice mode, control an amount of swap space utilized by an application, etc.

In some embodiments, the experiment parameters 503 can identify the features that are being turned off and on. The experiment parameter also identifies what to install. The experiment parameters may be in a recognized format that instructs the client device 102. The experiment parameters 503 can include a list of experiments that were turned on at a particular time. The list of experiments may include a number of web page experiences that are created to test user scenarios. For instance, the second user experience web page 121B and the third user experience web page 121C can be sites used for an experiment to test user retention against a control group that had access to the first user experience web page 121A.

In some configurations, individual configuration files 112 can include a resource identifier 314. The resource identifier 314, and other identifiers, can be used to associate a particular configuration with an originating source of information, such as a particular web page 121 a user accessed for obtaining information about a particular configuration.

In some embodiments, the configuration file 112 can be a JavaScript Object Notation (JSON) file. This example is provided for illustrative purposes and is not to be construed as limiting. It can be appreciated that the configuration files 112 can be in any suitable format containing any combination of parameters described herein.

In the example shown in FIG. 5, the first configuration file 314A includes a first set of installation parameters 501A, which can be used to control the application installer 110 to "Install Visual C++ without documents." The first configuration file 314A also includes a first experiment identifier 502A, named as "Control Group 1," which indicates that this configuration file is associated with a control group. The first configuration file 314A further includes experiment parameters 503A, which in this example are used to "turn off novice mode" in a particular application configuration. In this example, the first configuration 314A also includes the first resource identifier 314A.

The second configuration file 314B includes a second set of installation parameters 501B, which can be used to control the application installer 110 to "Install Visual C++ with first document set." The second configuration file 314B also includes a second experiment identifier 502B, named as "treatment group 1," indicating an association with a particular group type, e.g., a treatment group. The second configuration file 314B also includes experiment parameters 503B, which in this example are used to "turn on novice mode" in a particular application configuration. In this example, the second configuration 314B also includes the second resource identifier 314B.

The third configuration file 314C includes a third set of installation parameters 501C, which can be used to control the application installer 110 to "Install Visual C++ with second document set." The third configuration file 314C also includes a third experiment identifier 502C, which is named as "treatment group 2," indicating an association with a particular group type, e.g., a treatment group. The third configuration file 314C further includes experiment parameters 503C, which in this example are used to "limit swap space to 64k" in a particular application configuration. In this example, the third configuration 314C also includes the third resource identifier 314C.

The application installer 110 is configured to read the installation parameters 501, an experiment identifier 502 ("Experiment ID"), experiment parameters 503, and the resource identifier 314 and generate a specific application configuration 530, which may involve the installation of a particular application 515 and supporting data, such as the document sets 114A and B. As shown in FIG. 5, the application installer 110 is used to install a first application configuration 530A, a second application configuration 530B, and a third application configuration 530C.

In this illustrative example, the first application configuration 530A includes an executable file such as the application 515, e.g., Visual C++ without documents. The second application configuration 530B includes an executable file such as the application 515, e.g., Visual C++ and a first document set 114A. The third application configuration 530C includes an executable file such as the application 515, e.g., Visual C++ and a second document set 114B.

Figure 6:
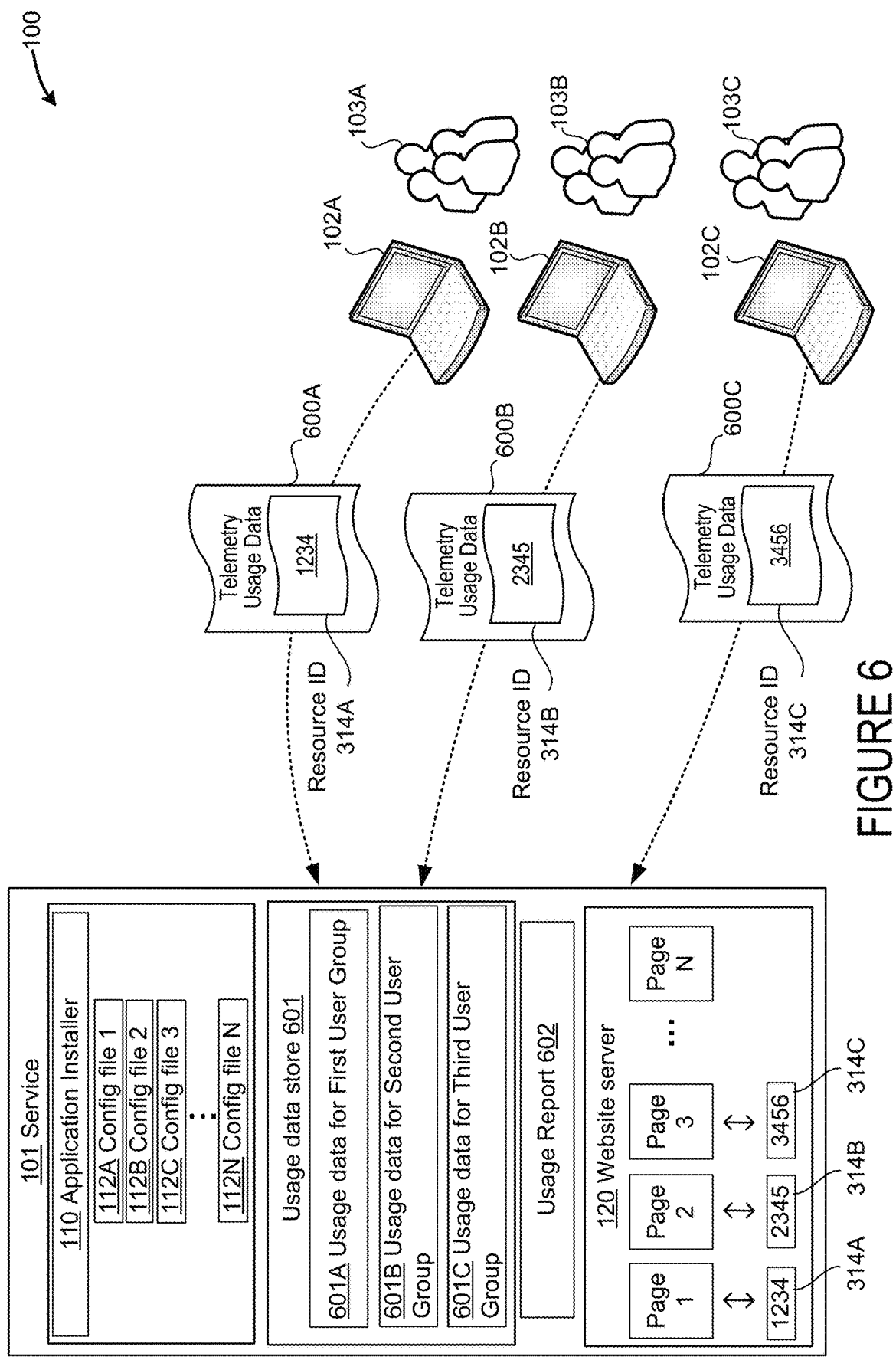
FIG. 6 is a block diagram illustrating the delivery of telemetry usage data for enabling a service to track user retention and other user activity.

Turning now to FIG. 6, aspects of telemetry usage data 600 sent from each application 515 are shown and described. In each application configuration 530, the installed application 515 is configured to return telemetry usage data 600. In some configurations, the telemetry usage data 600 includes user activity data with respect to the application 515. In one example, the telemetry usage data 600 can include at least one of a measurement indicating a date and time of use of the application 515, and/or a duration of use of the application 515. The telemetry usage data 600 can indicate any type of user activity that can be used to determine a performance metric related to user retention.

The telemetry usage data 600 can include any combination of a resource identifier 314, a campaign identifier 315, and/or an experiment identifier 502. In general, the resource identifier 314 can be used to associate a particular web page experience with the telemetry usage data 600. The experiment identifier 502 can indicate a group type or a particular group. In addition, the campaign identifier 315 allows the service 101 to track a user 103 through one or more experiments.

The service 101 receives the telemetry usage data 600 and stores it in a usage data store 601. The telemetry usage data 600 may be sorted or stored in a manner corresponding to a particular user group 103. For example, the respective client devices 102A of the users 103A of the control group generate and transmit telemetry usage data 600A to the service 101. The service stores the telemetry usage data 600A in association with usage data for the control group 601A. The service similarly respectively stores the telemetry usage data 600B and 600C in association with the usage data for the second group 601B and in association with usage data for the third group 601C. The service generates a usage report 602 summarizing the telemetry usage data. In some configurations, a summary can include data that is collected over a specified time period.

FIG. 7 illustrates an example usage report 602 generated by the system 100. The usage report 602 may be in any suitable format to accomplish one or more objectives of an experiment presenting several web page experiences to one or more groups 103. For example, if retention information is desired for a predetermined number (n) of days, the usage report 602 may only include an n-day retention score 702A. For example, if a multifactorial score is desired, the usage report may include other factors, illustrated by edit time score 702B, amount of data score 702C, total usage score 702D, and time spent score 702E. Each score may be associated with a particular web page experience 702F. The illustrated usage report 602 numerically adds the several scores to arrive at a total score 720.

In some embodiments, individual scores may be weighed in any manner selected to accomplish or reflect objectives of an experiment presenting several web page experiences to one or more user groups. In some embodiments, one or more of the scores may be associated with a configuration file 112, an experiment identifier 502, and/or a resource identifier 314. In some embodiments, the one or more associated scores may be used to cause individual changes to a configuration of the application 515 on a client device 102, or changes to any web page 121 experience.

The telemetry usage data 600 or the usage report 602 allow the service 101 to use resource identifier 314 to identify telemetry usage data from the individual user groups 103A, 103B, and 103C, and to tie the user groups to the experiment identifier 502. This allows the service 101 to correlate the specific configuration of the application 515 being installed to the experimental web page 121 served to an individual user. This allows the service 101 to tailor or modify the application 515 or a user 103 experience of the application based upon the telemetry usage data 600 or the usage report 602 based the actual application 515 that was installed.

Figure 8:
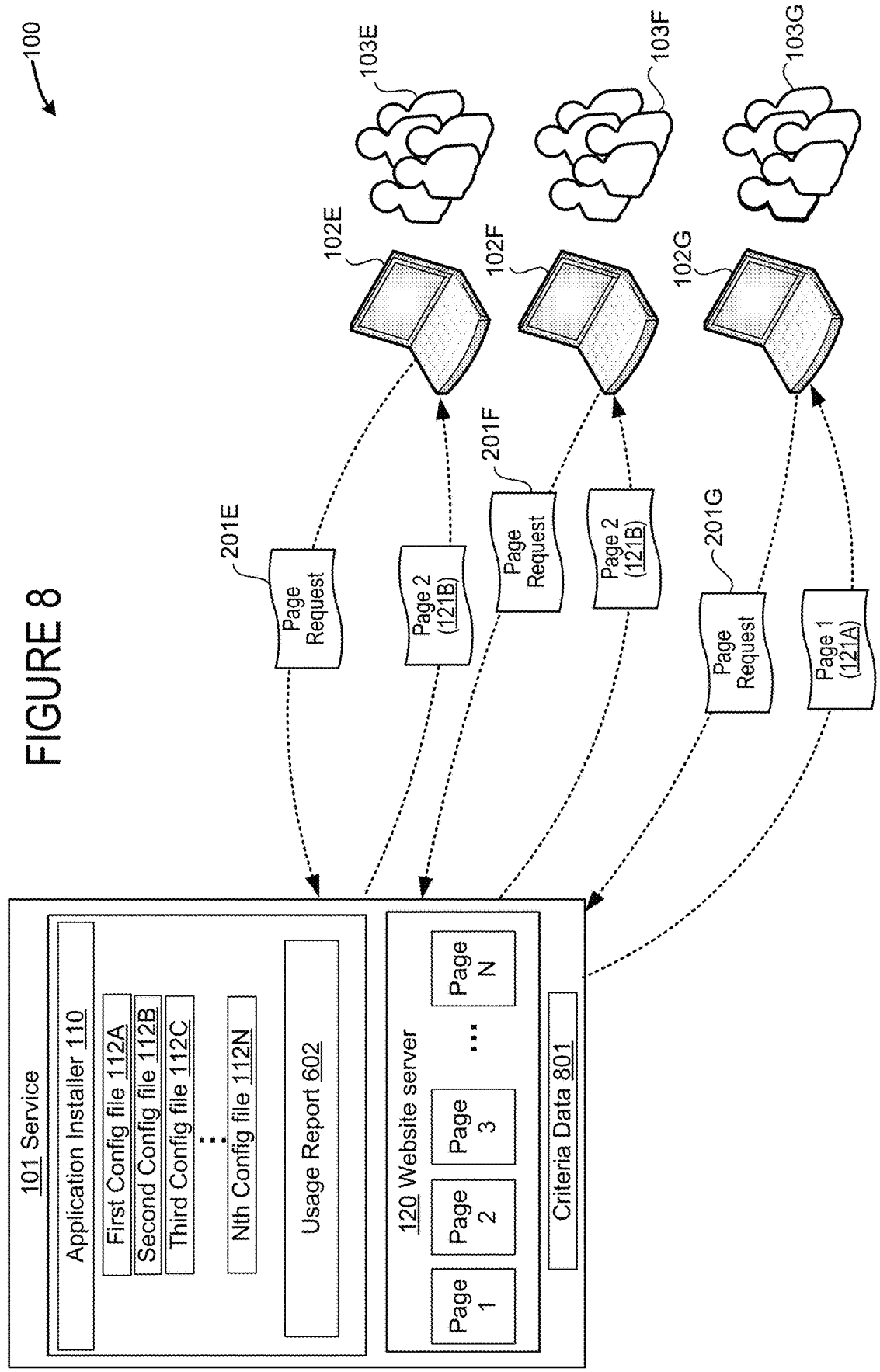
FIG. 8 is a block diagram showing how adjustments to a service can influence the delivery of one or more web pages.

FIG. 8 illustrates the functions of the system 100 in response to one or more modifications that are implemented as a result of the telemetry usage data 600 and/or the usage report 602. FIG. 8 illustrates an environment that includes at least one new user group, illustrated as a fourth user group 103E with its corresponding client devices 102E, a fifth user group 103F with its corresponding client devices 102F, and a sixth user group 102G with its corresponding client devices 102G.

In a manner similar to that illustrated in FIG. 2, new individual users of each group 103E, 103F, and 103G can respectively use their client devices 102E, 102F, and 102G to send a page request 201. The page request 201 can be transmitted via the network 140 to the website server 120 of the service 101. The page requests 201 are illustrated as items 201E, 201F, and 201G.

In this example, the usage report 602 and/or the telemetry usage data 600 is used to make adjustments to the website server 120. Given that example data of the usage report 602 indicates that page 2 has the highest level of retention, the web site server 120 can modify criteria, defined in any suitable criteria data 801, that is utilized by the website server 120 for directing web pages, and send the second web page 121B to a broader audience. In this example, the second web page 121B is sent to the fourth user group 103E and the fifth user group 103F. While the first web page 103A and the third web page 103C are sent less frequently. This example is provided for illustrative purposes and is not to be construed as limiting. It can be appreciated that any type of modification to the website server 120 based on the telemetry usage data 600 or the usage report 602 can fall within the scope of the present disclosure.

Figure 9:
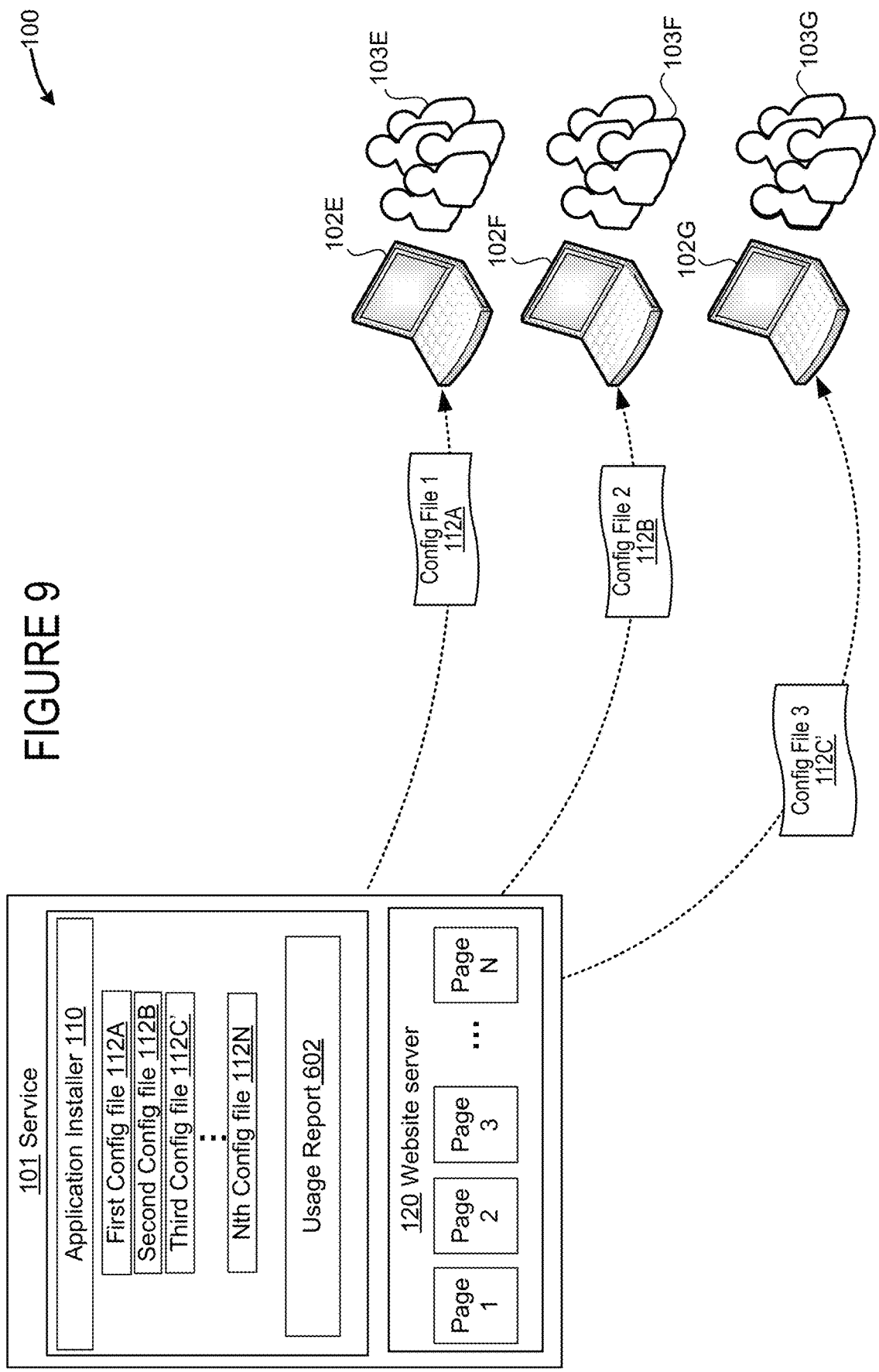
FIG. 9 is a block diagram showing how a configuration file can be modified.

FIG. 9 illustrates aspects of the telemetry usage data 600 that can be used to modify aspects of a configuration file. In this example, a modified configuration file 112C' is generated from the third configuration file 112C based on the telemetry usage data 600. Any number of file aspects can be modified such as the configuration parameters, experiment identifier, or the experiment parameters. FIG. 9 illustrates that the modified configuration file 112C' can be communicated to a client computing device 102 in a manner as described herein.

Figure 10:
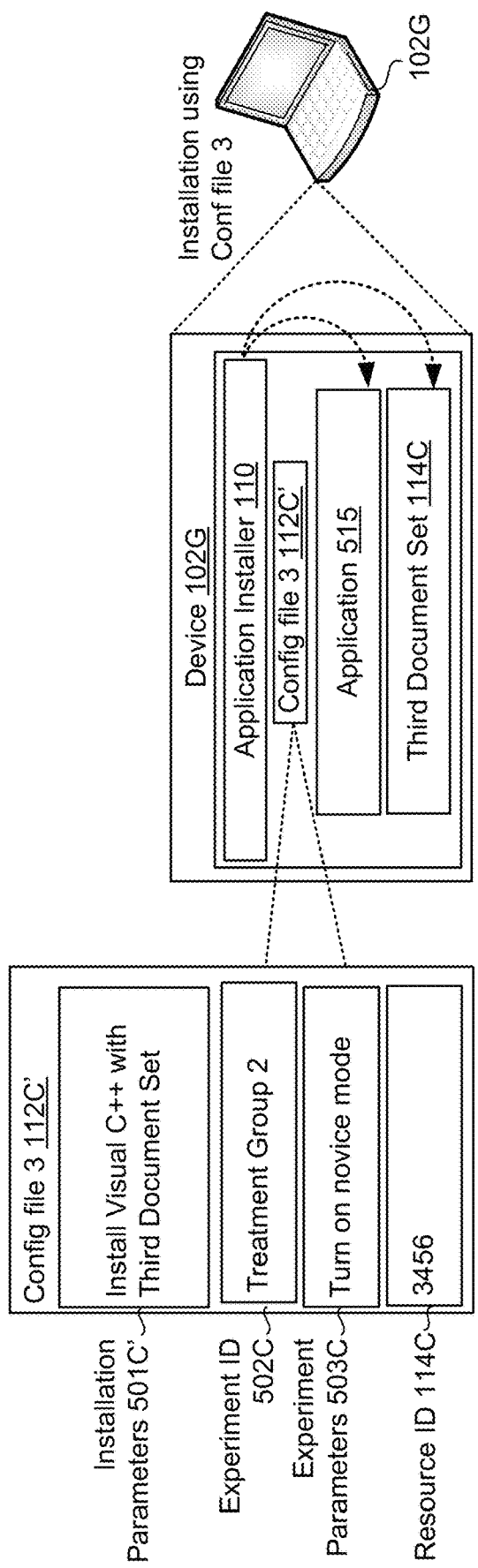
FIG. 10 illustrates details of a modified configuration file and an installation of the application on a client device.

FIG. 10 illustrates how the modified configuration file 112C' can impact an installation of the application 515 on the client device 102G. The modified configuration file 112C' can include modified installation parameters, modified experiment identifiers and/or modified experiment parameters. In this example, the modified configuration file 112C' includes modified installation parameters 501C', which include the installation of a third document set 114C. In addition, the experiment parameters 503C have been modified to turn on the novice mode. These examples are provided for illustrative purposes and are not to be construed as limiting. It can be appreciated that any modification to a configuration file can be within the scope of the present disclosure.

Figure 11:
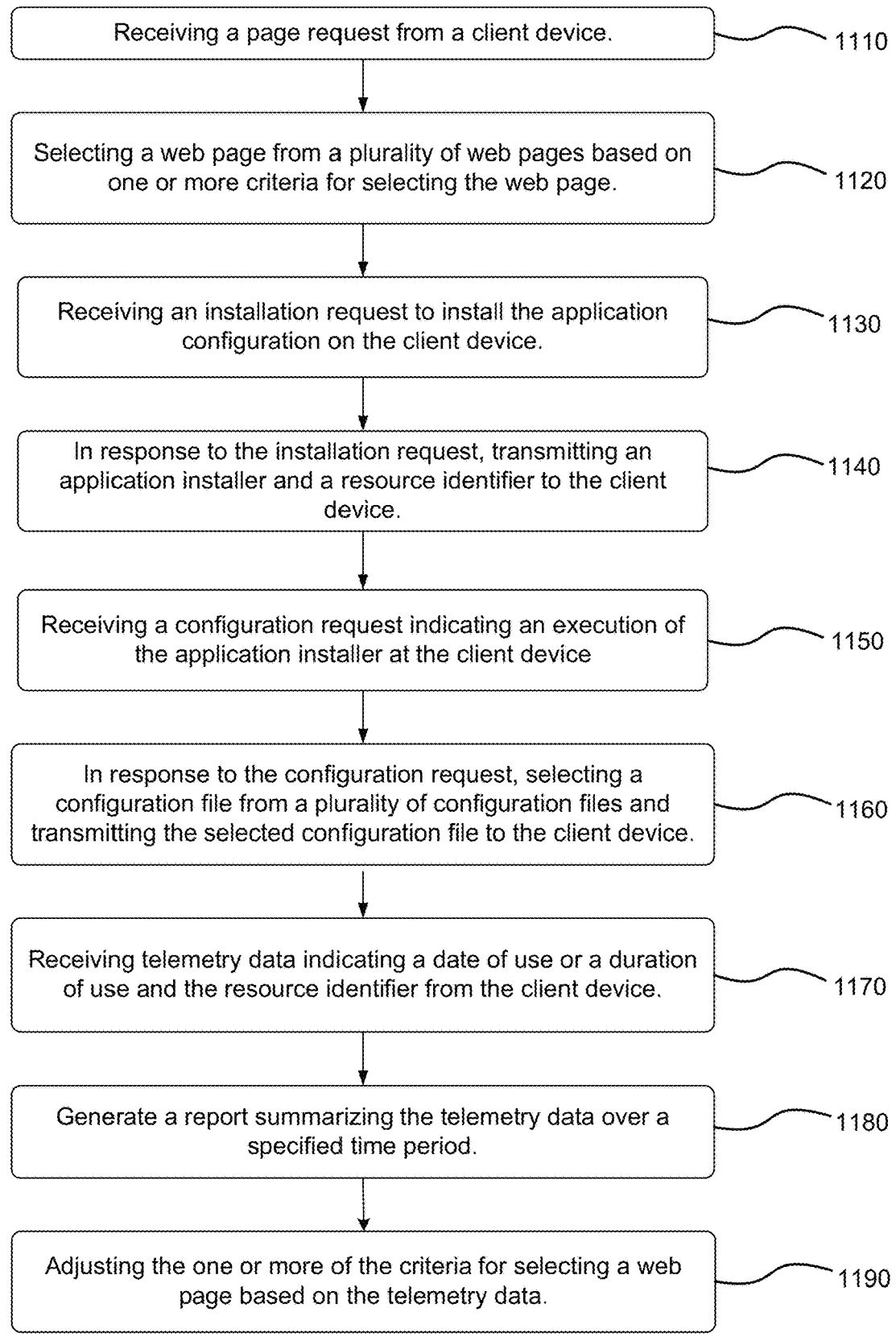
FIG. 11 illustrates an example flow diagram illustrating an example routine on a service.

FIG. 11 illustrates an example operational flow diagram illustrating an example routine 1100. While this routine is illustrated by reference to the system 100 described by FIGS. 1-10, and while an implementation of the example routine is described with reference to the service 101, implementation of the routine is not limited to the system 100.

The routine includes an operation 1110 receiving a page request 201 from a client device 102. The request can be in any suitable format using any suitable protocol.

The routine 1100 includes an operation 1120 selecting a web page 121A from a plurality of web pages. The web page 121A is selected based on one or more criteria for selecting a web page for a control group or a treatment group. In some embodiments of the operation 1120, the one or more criteria includes a criterion based on a referring search engine, referring blog group, or a tracked user activity.

The web page 121A can describe an application configuration and an offer to continue a user experience of the application on the client device. In one illustrative example, the offer can include instructions of how a user can download a rich client application to continue the experience that is described on the web page 121A. In some embodiments, graphical content 122 can include a text description of an offer to continue a user experience of the web page on a client device. The graphical content 122 can also include a selectable link that is configured to receive an input gesture from the user. In an embodiment, an application configuration may include at least one executable client application 515 and supporting documentation. In some embodiments, the application includes a software development application. For example, the software development application may include the Visual Studio software development application.

The routine includes an operation 1130 receiving an installation request 300 to install the application configuration on the client device. Next, at operation 1140, in response to the installation request, the service 101 can transmit an application installer 110 and a resource identifier 314 to the client device 102. The routine next includes an operation 1150 receiving a configuration request 401 indicating an execution of the application installer 110 at the client device 102.

The routine includes an operation 1160 in response to the configuration request 401, selecting a configuration file 112 from a plurality of configuration files. The configuration file 112 is selected based on the resource identifier 314. The operation 1160 includes transmitting the selected configuration file 112 to the client device 102. The installation parameters 501 of the configuration file 112 cause the application installer 110 to install the application configuration on the client device 102. The application configuration is configured to return telemetry usage data 600 with the resource identifier 314 or an experiment identifier 502.

The routine includes an operation 1170 receiving the telemetry data 600 indicating at least one of a measurement indicating a date of use or a duration of use of the application configuration 530. The telemetry data 600 comprising at least one of the resource identifiers 314 or the experiment identifier 502.

The routine includes an operation 1180 analyzing the telemetry data 600 to generate a usage report 602 comprising user retention data of the application configuration based on the telemetry data 600. In operation 1180, data defining the group type can be used to create a baseline of data for a control group. In some embodiments, the operation of generating the usage report further includes calculating a baseline for the control group for comparison to usage data of at least one treatment group. In some embodiments, the experiment identifier 502 indicates at least one treatment group, and wherein generating the usage report further includes generating a performance metric score indicating a retention score for the at least one treatment group within a predetermined period of time. In some embodiments, the configuration file further comprises one or more experiment parameters for controlling functions within the application configuration. For example, an experiment parameter may include turning on a novice mode or limiting swap space. In some embodiments, the telemetry data further comprises the campaign identifier for including usage data specific to an individual user in the report 602.

In some embodiments of operation 1180, generating a usage report includes associating a user retention feature flag with the selected configuration file in response to a retention score greater than a predetermined threshold. In some embodiments of operation 1180, the generating a usage report includes associating a user retention feature flag with the selected configuration file in response to a retention score greater than a retention score of another configuration file of the plurality of configuration files. In some embodiments of operation 1180, generating a usage report includes compiling a usage report scoring user retention for each configuration file of the plurality of configuration files. The data is responsive to a determined user retention score based of a plurality of client devices each having respective unique user experience identifiers. In some embodiments, the usage report includes a format configured to initiate or recommend a change in the selection or content of at least one configuration file of the plurality of configuration files.

In some embodiments, the routine includes an operation 1190 adjusting the one or more criteria to direct future web page installation requests 300 to specific web pages of the plurality of web pages based on the telemetry data 600. In some embodiments, the routine includes transmitting a campaign identifier 315 to the client device 102 with the resource identifier 314, and wherein the telemetry data 600 further comprises the campaign identifier for including usage data specific to an individual user 103 in the report 602. In some embodiments, the campaign identifier and the resource identifier are embedded in the filename of the application installer 110, and the application installer is configured to read the campaign identifier and the resource identifier from the filename upon execution. In an alternative embodiment of operation 1100, the routine includes an operation generating a modified configuration file 112 based on the telemetry data 600. The modified configuration file comprises a modified experiment identifier, a modified experiment parameter, or at least one modified installation parameter. In an embodiment, the modified experiment parameter changes at least one operating mode of the application configuration. For example, changing an operating mode may include turning a novice mode on for a treatment group, such as the treatment group 103B. In an embodiment, the at least one modified installation parameter 501 changes at least one function or associated data set of the application configuration.

It should be understood that operations of the routine 1100 disclosed herein and any other routine disclosed herein are not presented in any particular order and that performance of some or all of operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, operations, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 1100 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 1100 may be also implemented in many other ways. For example, the routine 1100 may be implemented, at least in part, by a processor of another remote computer or a local circuit. In addition, one or more of the operations of the routine 1100 may alternatively or additionally be implemented, at least in part, by a chipset working alone or in conjunction with other software modules. In the example described, one or more modules of a computing system can receive and/or process the data disclosed herein. Any service, circuit or application suitable for providing the techniques disclosed herein can be used in operations described herein.

Figure 12:
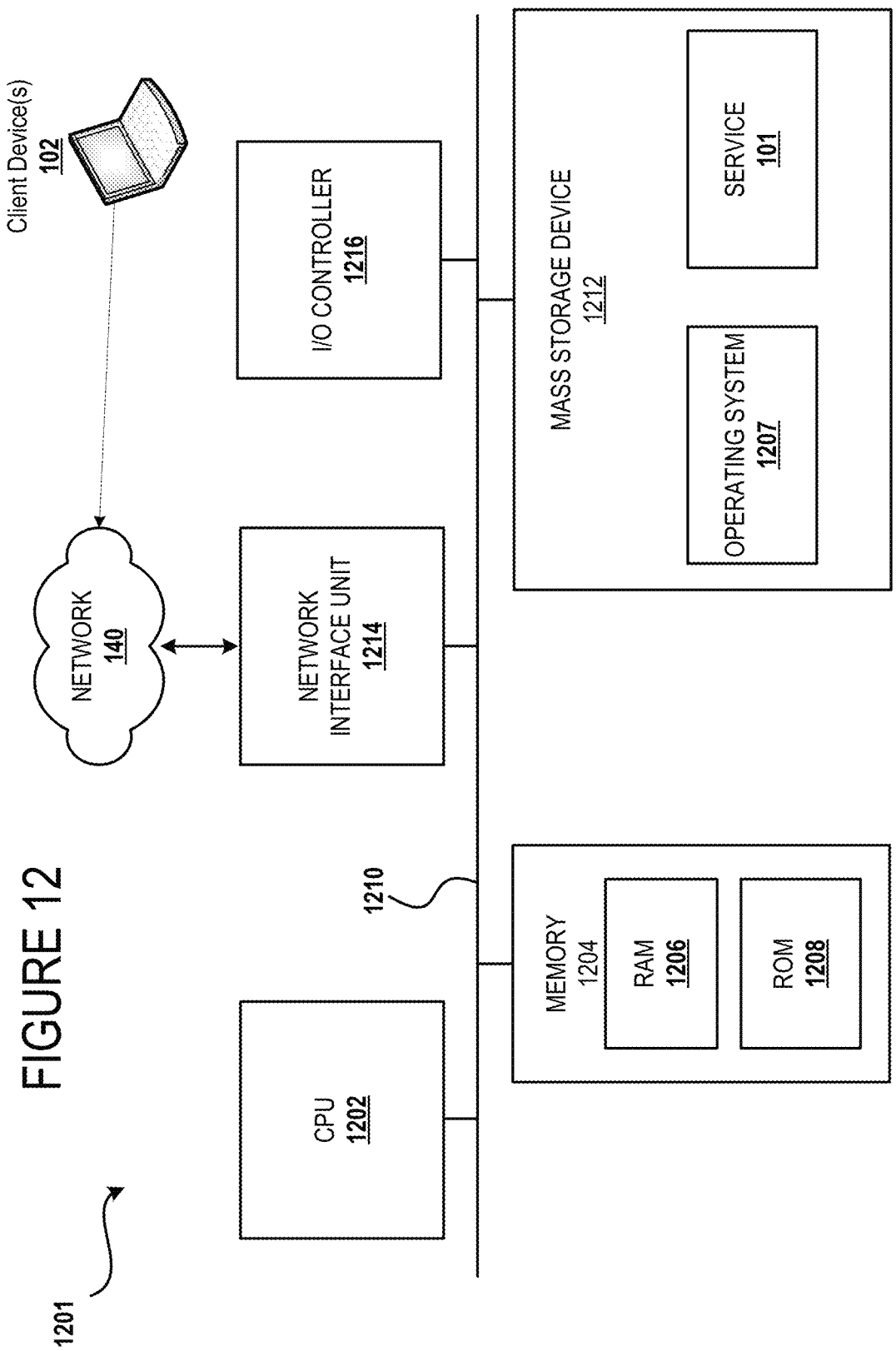
FIG. 12 illustrates an example computing system for implementing aspects of the present disclosure.

FIG. 12 illustrates an example computing system 1201 for a computer capable of executing the techniques and routines disclosed herein. Thus, the computing system 1201 illustrates an architecture for a client device, a server computer, or network of server computers, or any other types of computing devices suitable for implementing the functionality described herein. The computing system 1201 may be utilized to execute any aspects of the software components presented herein.

The computing system 1201 includes a central processing unit 1202 ("CPU"), a system memory 1204, including a random-access memory 1206 ("RAM") and a read-only memory ("ROM") 1208, and a system bus 1210 that couples the memory 1204 to the CPU 1202. A basic input/output system containing the basic routines that help to transfer information between elements within the computing system 1201, such as during startup, is stored in the ROM 1208. The computing system 1201 further includes a mass storage device 1212 for storing an operating system 1207, other data, and one or more application programs. The mass storage device further includes the service 101.

The mass storage device 1212 is connected to the CPU 1202 through a mass storage controller (not shown) connected to the bus 1210. The mass storage device 1212 and its associated computer-readable media provide non-volatile storage for the computing system 1201. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computing system 1201.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing system 1201. For purposes of the claims, the phrase "computer storage medium," "computer-readable storage medium" and variations thereof, does not include waves, signals, and/or other transitory and/or intangible communication media, per se.

According to various techniques, the computing system 1201 may operate in a networked environment using logical connections to remote computers through a network 140 and/or another network (not shown). The computing system 1201 may connect to the network 140 through a network interface unit 1214 connected to the bus 1210. It should be appreciated that the network interface unit 1214 also may be utilized to connect to other types of networks and remote computer systems. The computing system 1201 also may include an input/output controller 1216 for receiving and processing input from a number of other devices, including a keyboard, mouse, or electronic stylus (not shown in FIG. 12). Similarly, the input/output controller 1216 may provide output to a display screen, a printer, or other type of output device (also not shown in FIG. 12). It should also be appreciated that via a connection to the network 140 through a network interface unit 1214, the computing architecture may enable the system 1200 to communicate with the client device 102.

It should be appreciated that the software components described herein may, when loaded into the CPU 1205 and executed, transform the CPU 1205 and the overall computing system 1201 from a general-purpose computing system into a special-purpose computing system customized to facilitate the functionality presented herein. The CPU 1205 may be constructed from any number of transistors or other discrete circuit elements, which may individually or collectively assume any number of states. More specifically, the CPU 1205 may operate as a finite-state machine, in response to executable instructions contained within the software modules disclosed herein. These computer-executable instructions may transform the CPU 1205 by specifying how the CPU 1205 transitions between states, thereby transforming the transistors or other discrete hardware elements constituting the CPU 1205.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computing system 1201 in order to store and execute the software components presented herein. It also should be appreciated that the computing system 1201 may include other types of computing devices, including hand-held computers, embedded computer systems, personal digital assistants, and other types of computing devices known to those skilled in the art. It is also contemplated that the computing system 1201 may not include all of the components shown in FIG. 12, may include other components that are not explicitly shown in FIG. 12, or may utilize an architecture completely different than that shown in FIG. 12.

Figure 13:
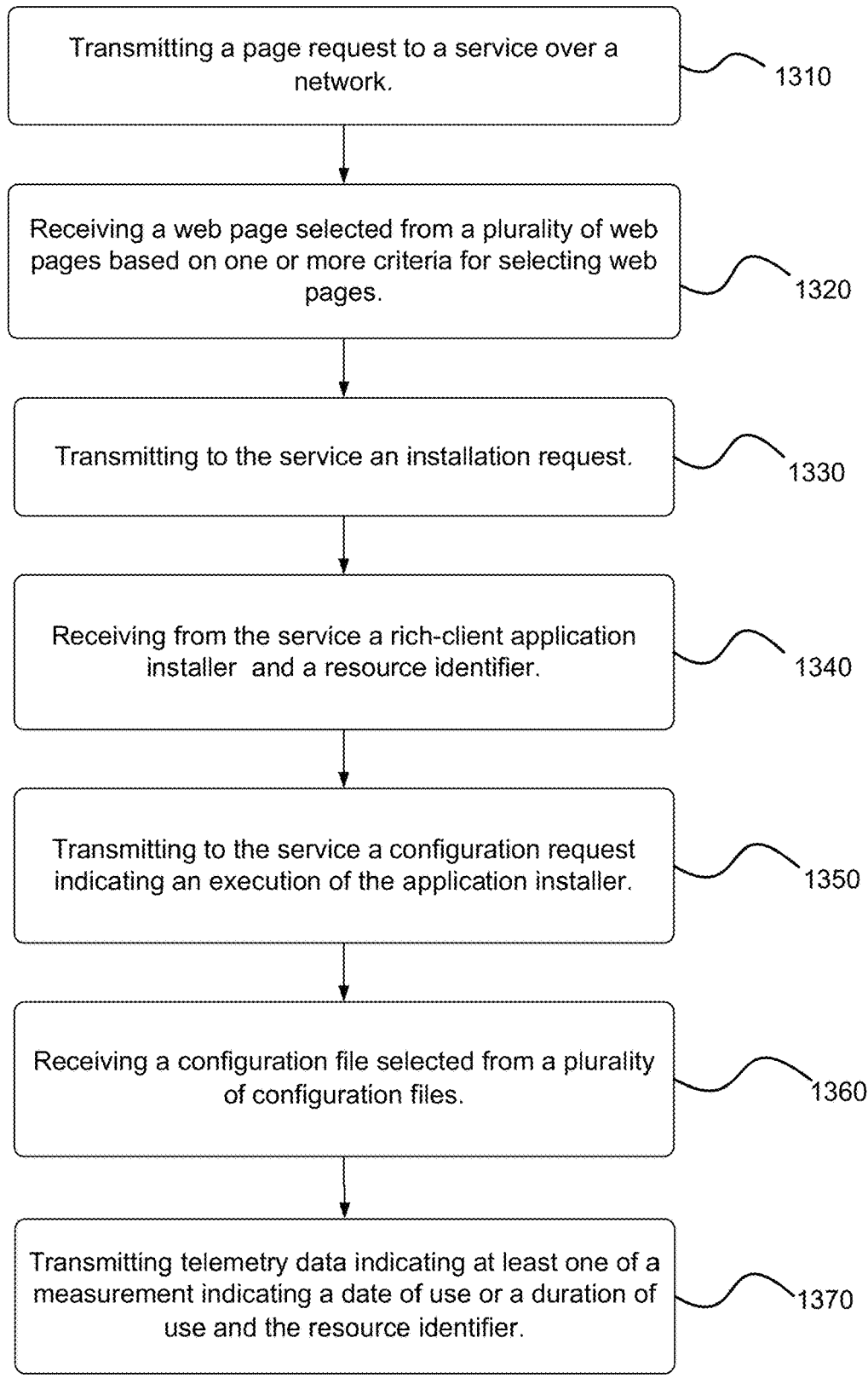
FIG. 13 illustrates an example flow diagram illustrating an example routine on a client device.

FIG. 13 illustrates an example operational flow diagram illustrating an example routine 1300 on a client device 102. While this routine is illustrated by reference to the system 100 described by FIGS. 1-10, and while an implementation of the example routine is described with reference to the service 101, implementation of the routine is not limited to the system 100. It should be understood that the operations of the example routine 1300 disclosed herein and any other routine disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

The routine 1300 includes an operation 1310 transmitting a page request 201 to a service 101 over a network 140. The routine includes an operation 1320 receiving from the service a web page 121A selected from a plurality of web pages 121. The selected web page describing an application 515 and including an offer to continue a user experience of the application on the client device. The web page 121A is selected based on one or more criteria for selecting at least one web page for a control group or for a treatment group. The routine includes an operation 1330 transmitting to the service 101 an installation request 300 to install an application configuration 530 on the client device 102. The routine includes an operation 1340 receiving from the service 101 a rich-client application installer 110 and a resource identifier 314. The routine includes an operation 1350 transmitting to the service 101 a configuration request 401 indicating an execution of the application installer 110 at the client device 102. The configuration request 401 includes the resource identifier 314.

The routine 1300 includes an operation 1360 receiving from the service 101 a configuration file 112 selected from a plurality of configuration files based on the resource identifier 314. The installation parameters 501 of the configuration file 112 cause the application installer 110 to install the application configuration 530 on the client device 102. The application configuration 530 is configured to return telemetry data 600 with the resource identifier 314 or an experiment identifier 502. The routine includes an operation 1370 transmitting to the service 101 the telemetry data 600 indicating at least one of a measurement indicating a date of use or a duration of use of the application configuration 530, the telemetry data 600 comprising at least one of the resource identifiers 314 or the experiment identifier 502.

In some embodiments, the operation 1370 includes receiving a campaign identifier 315 indicative of an individual user 103 of the client device 102, and the telemetry data 600 further comprises the campaign identifier. This provides tracking and reporting based upon the campaign identifier. In an embodiment, the operation 1370 includes receiving a campaign identifier indicative of an individual user of the client device, and the method further comprises receiving from the server 101 an instruction to turn on or off a feature, element, or parameter of the application 515. The instruction is addressed to the client device based on the campaign identifier. This allows individually addressing updates to the client device using the campaign identifier. In some embodiments, the application includes a software development application. In some embodiments, the configuration file includes a feature enhancement to the application, an application behavior, a documentation, or a drop-down presentation.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as A1, A2, and C together, A, B1, B2, C1, and C2 together, or B1 and B2 together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

The examples described herein are for illustrative purposes and are not to be construed as limiting. For instance, although some examples refer to an individual web page associated with a particular application configuration, can be appreciated that a web page providing information related to a configuration may include multiple pages or a section of a web page. A web page or group of web pages describing a product is also referred to herein as a "web page experience." Other document formats, other than a web page, can also be utilized to convey information about a particular configuration and to offer an experience that can extend to a rich application installed on the client device.

EXAMPLE CLAUSES

The disclosure presented herein may be considered in view of the following clauses.

Example Clause A: a method executing on a server device comprising: receiving a page request from a client device; selecting a web page from a plurality of web pages, the web page describing an application and including an offer to continue a user experience of the application on the client device, wherein the web page is selected based on one or more criteria for selecting at least one web page for a control group or a treatment group; receiving an installation request to install an application configuration on the client device; in response to the installation request, transmitting an application installer and a resource identifier to the client device; receiving a configuration request indicating an execution of the application installer at the client device, wherein the configuration request comprises the resource identifier; in response to the configuration request, selecting a configuration file from a plurality of configuration files based on the resource identifier, and transmitting the selected configuration file to the client device, wherein installation parameters of the configuration file causes the application installer to install the application configuration on the client device, and wherein the application configuration is configured to return telemetry data with the resource identifier, an experiment identifier, or a campaign identifier; receiving the telemetry data indicating at least one of a measurement indicating a date of use or a duration of use of the application configuration, the telemetry data comprising at least one of the resource identifier, the experiment identifier, or the campaign identifier; analyzing the telemetry data to generate a usage report comprising user retention data of the application configuration based on the telemetry data; and adjusting the one or more criteria based on the telemetry data to generate updated criteria for selecting one or more web pages for the control group or the treatment group in response to additional web page requests.

Example Clause B: the method executing on a server device of Example Clause A, wherein the experiment identifier defines at least one of a group type or a group name, the group type indicating that a user group is at least one control group or at least one treatment group, wherein generating the usage report further includes generating a baseline of usage data for the control group for comparison to usage data of at least one treatment group.

Example Clause C: the method executing on a server device of any one of Example Clauses A through B, wherein the experiment identifier indicates at least one treatment group, and wherein generating the usage report further includes generating a performance metric score indicating a retention score for the at least one treatment group within a predetermined period of time.

Example Clause D: the method executing on a server device of any one of Example Clauses A through C, wherein the configuration file further comprises one or more experiment parameters for controlling functions within the application configuration.

Example Clause E: the method executing on a server device of any one of Example Clauses A through D, wherein the method further comprises transmitting the campaign identifier to the client device with the resource identifier, and wherein the telemetry further comprises the campaign identifier for including usage data specific to an individual user in the report.

Example Clause F: the method executing on a server device of Example Clauses A through E, wherein the campaign identifier and the resource identifier are embedded in the filename of the application installer, wherein the application installer is configured to read the campaign identifier and the resource identifier from the filename upon execution.

Example Clause G: the method executing on a server device of any one of Example Clauses A through F, wherein the method further includes generating a modified configuration file based on the telemetry data, wherein the modified configuration file comprises a modified experiment identifier, a modified experiment parameter, or at least one modified installation parameter.

Example Clause H: the method executing on a server device of any one of Example Clause G, wherein the modified experiment parameter changes at least one operating mode of the application configuration.

Example Clause I: the method executing on a server device of any one of Example Clause G, wherein the at least one modified installation parameter changes at least one function or associated data set of the application configuration.

Example Clause J: the method executing on a server device of any one of Example Clauses A through I, wherein application configuration comprises at least one executable client application and supporting documentation.

Example Clause K: a system comprising: one or more processing units; and a computer-readable storage medium in communication with the one or more processing units and having computer-readable instructions stored thereon that when executed by the one or more processors, cause the computing device to: select a web page from a plurality of web pages, the web page describing an application and including an offer to continue a user experience of the application on the client device, wherein the web page is selected based on one or more criteria for selecting at least one web page for a control group or a treatment group; receive an installation request to install an application configuration on the client device; in response to the installation request, transmit a resource identifier to the client device; receive a configuration request indicating an execution of an application installer at the client device, wherein the configuration request comprises the resource identifier; in response to the configuration request, select a configuration file from a plurality of configuration files, wherein the configuration file is selected based on the resource identifier, and transmitting the selected configuration file to the client device, wherein installation parameters of the configuration file causes the application installer to install the application configuration on the client device, and wherein the application configuration is configured to return telemetry data with an experiment identifier; receive the telemetry data indicating at least one of a measurement indicating a date of use or a duration of use of the application configuration, the telemetry data comprising at least one of the resource identifier or the experiment identifier; and analyze the telemetry data to generate a usage report comprising user retention data of the application configuration based on the telemetry data.

Example Clause L: the system of Example Clause K, wherein the computer-readable storage medium comprises further instructions causing the computing device to: determine that the client device is storing a current copy of the application installer; and transmit the resource identifier to the client device, in response to determining that the client device is storing a current copy of the application installer.

Example Clause M: the system of any one of Example Clauses K through L, wherein the computer-readable storage medium comprises further instructions causing the computing device to: adjust the one or more criteria based on the telemetry data to generate updated criteria for selecting one or more web pages for the control group or the treatment group in response to additional web page requests.

Example Clause N: the system of any one of Example Clauses K through M, wherein the experiment identifier defines at least one of a group type or a group name, the group type indicating that a user group is at least one control group or at least one treatment group, and wherein generating the usage report further includes generating a baseline of usage data for the control group for comparison to usage data of at least one treatment group.

Example Clause O: the system of any one of Example Clauses K through N, wherein the experiment identifier indicates at least one treatment group, and wherein generating the usage report further includes generating a performance metric score indicating a retention score for the at least one treatment group within a predetermined period of time.

Example Clause P: the system of any one of Example Clauses K through O, wherein the telemetry data further includes a campaign identifier, and wherein the usage report further includes a correlation of user retention data with an identifier of an individual user based upon the campaign identifier.

Example Clause Q: a method implemented in a client device and comprising: transmitting a page request to a service over a network; receiving from the service a web page selected from a plurality of web pages, the selected web page describing an application and including an offer to continue a user experience of the application on the client device, wherein the web page is selected based on one or more criteria for selecting at least one web page for a control group or for a treatment group; transmitting to the service an installation request to install an application configuration on the client device; receiving from the service a rich-client application installer and a resource identifier; transmitting to the service a configuration request indicating an execution of the application installer at the client device, wherein the configuration request includes the resource identifier; receiving from the service a configuration file selected from a plurality of configuration files based on the resource identifier, wherein installation parameters of the configuration file cause the application installer to install the application configuration on the client device, and wherein the application configuration is configured to return telemetry data with the resource identifier or an experiment identifier; and transmitting to the service the telemetry data indicating at least one of a measurement indicating a date of use or a duration of use of the application configuration, the telemetry data comprising at least one of the resource identifiers or the experiment identifier.

Example Clause R: the method of Example Clause Q, wherein the receiving from the service includes receiving a campaign identifier indicative of an individual user of the client device, and wherein the telemetry data further comprises the campaign identifier.

Example Clause S: the method of any one of Example Clauses Q through R, wherein the receiving from the service includes receiving a campaign identifier indicative of an individual user of the client device, and the method further comprises receiving from the server an instruction to turn on or off a feature, element, or parameter of the application, the instruction addressed to the client device based on the campaign identifier.

Example Clause T: the method of any one of Example Clauses Q through S, wherein the application includes a software development application.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method executing on a server device, comprising:
receiving a web page request from a client device;
in response to the web page request, selecting a web page from a plurality of web pages associated with an application, the web page describing the application and including an offer to continue a user experience of the application on the client device via an installation of an application configuration, wherein the web page is selected based on one or more criteria;
receiving, via the selected web page, an installation request to install the application configuration on the client device;
in response to the installation request, transmitting an application installer and a resource identifier to the client device;
receiving a configuration request indicating an execution of the application installer at the client device, wherein the configuration request comprises the resource identifier;
in response to the configuration request, selecting a configuration file from a plurality of configuration files based on the resource identifier;
transmitting the selected configuration file to the client device, wherein installation parameters of the configuration file causes the application installer to install the application configuration on the client device, and wherein the application configuration is configured to return telemetry data with the resource identifier and an experiment identifier associated with one or more experiment parameters that modify one or more features associated with the application configuration;
receiving the telemetry data including a measurement indicating at least one of a date of use or a duration of use of the application configuration, the telemetry data comprising the resource identifier and the experiment identifier;
analyzing the telemetry data to generate user retention data of the application configuration based on the experiment identifier; and
adjusting the one or more criteria based on the user retention data to generate updated criteria for selecting one of the plurality of web pages associated with the application in response to additional web page requests, wherein the updated criteria reflects an importance of the one or more features.

2. The method of claim 1, wherein the experiment identifier defines at least one of a group type, the group type indicating that a user group is at least one control group and at least one treatment group, wherein analyzing the telemetry data further comprises generating a usage report having a baseline of usage data for the at least one control group for comparison to usage data of the at least one treatment group.

3. The method of claim 2, wherein one or more criteria for selecting one or more web pages for the control group or the treatment group is updated in response to determining that the one or more web pages is related to the treatment group.

4. The method of claim 1, wherein the experiment identifier indicates at least one treatment group, and wherein analyzing the telemetry data further comprises generating a usage report having a performance metric score indicating a retention score for the at least one treatment group within a predetermined period of time.

5. The method of claim 1, wherein the one or more experiment parameters control functions within the application configuration.

6. The method of claim 1, further comprises transmitting a campaign identifier to the client device with the resource identifier, wherein the telemetry data further comprises the campaign identifier for including usage data specific to an individual user in a usage report.

7. The method of claim 6, wherein the campaign identifier and the resource identifier are embedded in a filename of the application installer, wherein the application installer is configured to read the campaign identifier and the resource identifier from the filename upon execution.

8. The method of claim 1, further comprising, generating a modified configuration file based on the telemetry data, wherein the modified configuration file comprises a modified experiment identifier, a modified experiment parameter, or at least one modified installation parameter.

9. The method of claim 8, wherein the modified experiment parameter changes at least one operating mode of the application configuration.

10. The method of claim 8, wherein the at least one modified installation parameter changes at least one function or associated data set of the application configuration.

11. The method of claim 1, wherein the application configuration comprises at least one executable client application and supporting documentation.

12. The method of claim 1, wherein the user retention data defines at least one of the date of use or the duration of use of the application configuration.

13. The method of claim 1, wherein the one or more features modified by the one or more experiment parameters of the experiment identifier are associated with different application configurations.

14. A system comprising:
one or more processing units; and
a computer-readable storage medium in communication with the one or more processing units and having computer-readable instructions stored thereon that when executed by the one or more processing units, cause a computing device to:
receive a web page request from a client device;
in response to the web page request, select a web page from a plurality of web pages associated with an application, the web page describing the application and including an offer to continue a user experience of the application on the client device via an installation of an application configuration, wherein the web page is selected based on one or more criteria;
receive, via the selected web page, an installation request to install the application configuration on the client device;
in response to the installation request, transmit a resource identifier to the client device;
receive a configuration request indicating an execution of an application installer at the client device, wherein the configuration request comprises the resource identifier;
in response to the configuration request, select a configuration file from a plurality of configuration files, wherein the configuration file is selected based on the resource identifier;
transmit the selected configuration file to the client device, wherein installation parameters of the configuration file causes the application installer to install the application configuration on the client device, and wherein the application configuration is configured to return telemetry data for an experiment identifier associated with one or more experiment parameters that modify one or more features associated with the application configuration;
receive the telemetry data including a measurement indicating at least one of a date of use or a duration of use of the application configuration, the telemetry data comprising the resource identifier and the experiment identifier;
analyze the telemetry data to generate a usage report comprising user retention data of the application configuration based on the experiment identifier; and
adjust the one or more criteria based on the user retention data to generate updated criteria for selecting one of the plurality of web pages associated with the application in response to additional web page requests, wherein the updated criteria reflects an importance of the one or more features.

15. The system of claim 14, wherein the computer-readable storage medium comprises further instructions causing the computing device to:
determine that the client device is storing a current copy of the application installer; and
transmit the resource identifier to the client device, in response to determining that the client device is storing the current copy of the application installer.

16. The system of claim 14, wherein the telemetry data further includes a campaign identifier, and wherein the usage report further includes a correlation of the user retention data with an identifier of an individual user based upon the campaign identifier.

17. A method implemented in a client device, the method comprising:
transmitting a web page request to a service over a network;
receiving, from the service, a web page selected from a plurality of web pages associated with an application in response to the web page request, the selected web page describing the application and including an offer to continue a user experience of the application on the client device via an installation of an application configuration, wherein the web page is selected based on one or more criteria;
transmitting to the service, via the selected web page, an installation request to install the application configuration on the client device;
receiving from the service an application installer and a resource identifier;
transmitting to the service a configuration request indicating an execution of the application installer at the client device, wherein the configuration request includes the resource identifier;
receiving from the service a configuration file selected from a plurality of configuration files based on the resource identifier, wherein installation parameters of the configuration file cause the application installer to install the application configuration on the client device, and wherein the application configuration is configured to return telemetry data for the resource identifier and an experiment identifier associated with one or more experiment parameters that modify one or more features associated with the application configuration;
transmitting to the service, the telemetry data including a measurement indicating at least one of a date of use or a duration of use of the application configuration, the telemetry data comprising the resource identifier and the experiment identifier; and
adjusting the one or more criteria based on the telemetry data to generate updated criteria for selecting one of the plurality of web pages associated with the application in response to additional web page requests, wherein the updated criteria reflects an importance of the one or more features.

18. The method of claim 17, further comprising receiving a campaign identifier indicative of an individual user of the client device, and wherein the telemetry data further comprises the campaign identifier.

19. The method of claim 17, further comprising:
receiving a campaign identifier indicative of an individual user of the client device, and
receiving from the service an instruction to turn on or off a feature, element, or parameter of the application, the instruction addressed to the client device based on the campaign identifier.

20. The method of claim 17, wherein the application includes a software development application.

* * * * *